(12) United States Patent
Miller et al.

(10) Patent No.: US 10,962,084 B2
(45) Date of Patent: Mar. 30, 2021

(54) DAMPER ASSEMBLY

(71) Applicant: ILLINOIS TOOL WORKS INC., Glenview, IL (US)

(72) Inventors: Karly R. Miller, Orland Park, IL (US); Steven L. Bivens, Kankakee, IL (US); Jeffrey S. Cascio, Tinley Park, IL (US); Daniel T. Lindsey, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/336,919

(22) PCT Filed: Sep. 20, 2017

(86) PCT No.: PCT/US2017/052379
§ 371 (c)(1),
(2) Date: Mar. 27, 2019

(87) PCT Pub. No.: WO2018/080663
PCT Pub. Date: May 3, 2018

(65) Prior Publication Data
US 2020/0032873 A1 Jan. 30, 2020

Related U.S. Application Data

(60) Provisional application No. 62/415,079, filed on Oct. 31, 2016.

(51) Int. Cl.
*F16F 15/123* (2006.01)

(52) U.S. Cl.
CPC ............... *F16F 15/1232* (2013.01)

(58) Field of Classification Search
CPC . F16F 15/1232; F16F 9/12; E05F 3/08; E05F 3/20; E05F 3/14
See application file for complete search history.

(56) References Cited

U.S. PATENT DOCUMENTS

| 1,688,428 A | * | 10/1928 | Morgan | .................... E05F 3/08 |
| | | | | 16/53 |
| 5,109,571 A | * | 5/1992 | Ohshima | ................ A47K 13/10 |
| | | | | 16/284 |

(Continued)

FOREIGN PATENT DOCUMENTS

| EP | 0406750 A1 | * | 1/1991 | ............ E05F 1/1215 |
| EP | 0422882 A1 | | 4/1991 | |
| WO | 2011/150095 A1 | | 12/2011 | |

OTHER PUBLICATIONS

International Search Report and Written Opinion of the International Search Authority for PCT/US2017/052379, dated Dec. 18, 2017.

*Primary Examiner* — Xuan Lan Nguyen
(74) *Attorney, Agent, or Firm* — Quarles & Brady LLP

(57) ABSTRACT

A damper assembly (100) is configured to dampen motion between a first component and a second component. The damper assembly (100) includes a housing (102) having at least one housing rotation-limiting protuberance (126). A rotor (104) is rotatably coupled to the housing (102). The rotor (104) includes at least one rotor rotation-limiting protuberance (160). The housing rotation-limiting protuberance(s) (126) and the rotor rotation-limiting protuberance(s) (160) cooperate to limit a range of rotation of the rotor (104) relative to the housing (102).

19 Claims, 8 Drawing Sheets

(56) References Cited

U.S. PATENT DOCUMENTS

| | | | | |
|---|---|---|---|---|
| 5,211,269 A | * | 5/1993 | Ohshima | E05F 3/14 |
| | | | | 16/52 |
| 6,336,252 B1 | * | 1/2002 | Bando | F16F 7/06 |
| | | | | 16/307 |
| 6,594,864 B2 | * | 7/2003 | Epp | B60J 3/0265 |
| | | | | 16/280 |
| 6,634,061 B1 | * | 10/2003 | Maynard | H04M 1/0216 |
| | | | | 16/319 |
| 6,922,869 B2 | | 8/2005 | Bivens et al. | |
| 8,182,055 B2 | * | 5/2012 | Yun | E05F 1/1215 |
| | | | | 188/290 |
| 8,769,770 B2 | * | 7/2014 | Kullman | B65F 1/068 |
| | | | | 16/54 |
| 2003/0228918 A1 | * | 12/2003 | Doornbos | F16D 41/206 |
| | | | | 464/57 |
| 2005/0034269 A1 | | 2/2005 | Jinbo | |

* cited by examiner

DAMPER ASSEMBLY

RELATED APPLICATIONS

This application represents the United States National Stage of International Application No. PCT/US2017/052379, filed Sep. 20, 2017, which claims priority to U.S. Provisional Patent Application No. 62/415,079, entitled "Damper Assembly," filed Oct. 31, 2016, which are hereby incorporated by reference in their entirety.

FIELD OF EMBODIMENTS OF THE DISCLOSURE

Embodiments of the present disclosure generally relate to damper assemblies, such as may be used to dampen motion in relation to one or more components.

BACKGROUND

Various compartments are configured to be selectively opened and closed. For example, a glove box or compartment within a vehicle is configured to be opened so that one or more items may be stored therein, and then closed to securely retain the item(s). A typical glove box includes a main housing and a cover (such as a door, panel, lid, or the like) that is moveably secured to the main housing between an open position and a closed position. For example, the cover may be pivotally secured to the main housing. The cover includes a securing member, such as a latch, that cooperates with a complementary structure of the main housing to ensure that the cover is secured in the closed position.

Dampers are used to dampen motion of a component, such as within an interior cabin of a vehicle. For example, dampers are configured to control opening motion between a glove box housing and a cover. Dampers are used with respect to various components, such as covers, bins, flaps, assist grip handles, and/or the like within an interior cabin of a vehicle.

WO 2011/150095, entitled "Damper," discloses a damper for dampening the movement of a component. U.S. Pat. No. 6,922,869, entitled "Damper Apparatus," discloses a damper apparatus for damping movement between first and second elements.

Known bin assemblies that include dampers and springs may be difficult to operate due to the force exerted by the spring. Further, once installed, the spring may exert undesired twisting forces into the assembly.

SUMMARY OF EMBODIMENTS OF THE DISCLOSURE

A need exists for a spring-loaded damper assembly that is easy to assemble and install into and/or onto a component. Further, a need exists for a damper assembly that eliminates, minimizes, or otherwise reduces undesired twisting forces.

With those needs in mind, certain embodiments of the present disclosure provide a damper assembly that is configured to dampen motion between a first component and a second component. The damper assembly includes a housing having at least one housing rotation-limiting protuberance. A rotor is rotatably coupled to the housing. The rotor includes at least one rotor rotation-limiting protuberance. The housing rotation-limiting protuberance(s) and the rotor rotation-limiting protuberance(s) cooperate to limit a range of rotation of the rotor relative to the housing.

In at least one embodiment, the at least one housing rotation-limiting protuberance includes a first housing rotation-limiting protuberance and a second housing rotation-limiting protuberance, and the at least one rotor rotation-limiting protuberance includes a first rotor rotation-limiting protuberance radially positioned between the first housing rotation-limiting protuberance and the second housing rotation-limiting protuberance.

In at least one embodiment, a spring is operatively coupled to the housing and the rotor. The spring may include a coiled body, a first end extending from the coiled body, wherein the first end is coupled to the rotor, and a second end extending from the coiled body, wherein the second end is coupled to the housing.

In at least one embodiment, the housing includes a spring retainer that retains a portion of the spring to secure the rotor in a preloaded position relative to the housing. For example, the spring retainer may include a beam and a canted beam extending from the beam. A spring-retaining channel is defined between the beam and the canted beam. The spring retainer may include a sleeve that fits around an outer circumference of a portion of the spring. The spring may include a bend that is configured to securely couple the spring to the spring retainer.

The housing may include a cylindrical main body including a base integrally formed with a circumferential wall, an annular rim extending from the wall, and a rotor support column extending from the base. A rotor retention channel is formed between the circumferential wall and the rotor support column. The housing rotation-limiting protuberance(s) may extend from the rotor support column.

The rotor may include a support tube, an intermediate circumferential ledge that caps the support tube, and a spring-retaining member that extends from the intermediate circumferential ledge opposite from the support tube. The spring-retaining member may include an outer wall that connects to inwardly-canted lead-in walls that lead into a spring channel, interior fins that connect to the lead-in walls, and an end wall connected to the interior fins.

Figure 1:
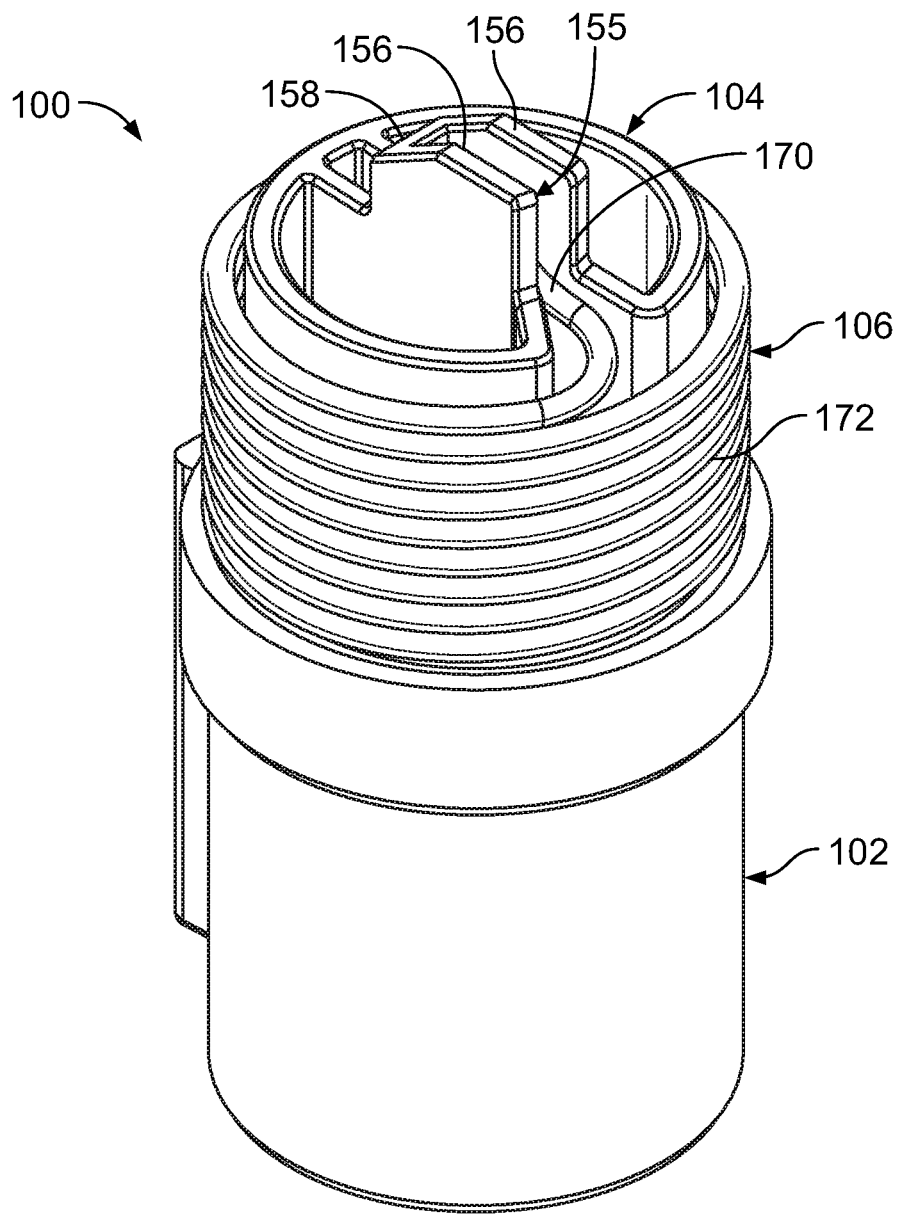
FIG. 1 illustrates a perspective top view of a damper assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a damper assembly that is easy to assemble and install in relation to one or more components. The damper assembly is balanced in that undesired twisting forces are eliminated, minimized, or otherwise reduced. In at least one embodiment, the damper assembly includes a spring that improves torque balance. The spring may be preloaded into a housing to allow for simple loading into a full component assembly.

The damper assembly includes a rotor and a housing. The damper assembly also includes a damping media, such as a fluid, that is retained within the housing and/or the rotor. To facilitate efficient spring pre-loading, the rotor includes a protuberance (such as a post, bump, block, and/or the like) that limits rotation of the rotor in relation to the housing. The rotor and the housing include counterpart protuberances that cooperate to provide a stop barrier for spring pre-loading, while still allowing the damper assembly to be torque tested during an assembly process.

During spring installation, the rotor tends to rotate as the spring is pulled over to engage a spring retainer of the housing. The interaction between the protuberances of the housing and the rotor limits rotation of the rotor relative to the housing, thereby allowing the spring to attach to the housing in a preloaded position.

The damper assembly may be loaded onto a component (such as a bin), and then mated to another component (such as a door pivotally coupled to the bin). As the door is closed, the rotor rotates the spring into the fully closed position, thereby allowing for a desired magnitude of force to be applied to the door once a latch is released. In this manner, there is no need for additional preloading. As such, the installation process is efficient.

Embodiments of the present disclosure provide a damper assembly including a housing, a rotor rotatably secured within the housing, and a spring that is configured to couple to the housing and the rotor in a preloaded position. The damper assembly is easy to assemble and install. The damper assembly is balanced in that undesired twisting forces are not exerted therein. The spring may be preloaded into the housing to allow for simple loading into a full component assembly, such as that of a glove compartment, overhead console bin (such as a sunglass bin), an assist handle, door handles, center consoles, and/or the like within a vehicle.

FIG. 1 illustrates a perspective top view of a damper assembly 100, according to an embodiment of the present disclosure. The damper assembly includes a housing 102 and a rotor 104 that is rotatably secured to the housing 102. A spring 106 is operatively coupled to the housing 102 and the rotor 104.

Figure 2:
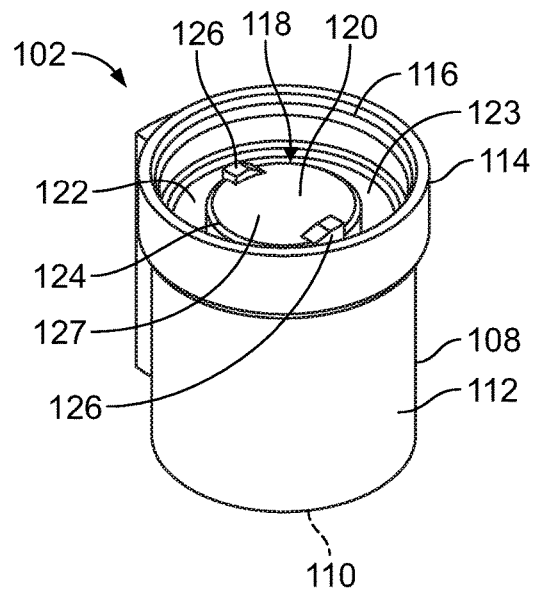
FIG. 2 illustrates a perspective top view of a housing, according to an embodiment of the present disclosure.

FIG. 2 illustrates a perspective top view of the housing 102, according to an embodiment of the present disclosure. The housing 102 includes a cylindrical main body 108 that includes a base 110 integrally formed with a circumferential wall 112. An annular rim 114 extends from an upper portion of the wall 112. The rim 114 has an inner surface 116 that surrounds an interior cavity 118 defined by the inner surface 116 of the annular rim 114, an inner surface 122 of the circumferential wall 112, and an inner surface of the base 110. A cylindrical rotor support column 120 extends upwardly from the base 110 into the cavity 118. A rotor retention channel 123 is formed between the inner surface 122 of the wall 112 and an outer surface 124 of the rotor support column 120.

Housing rotation-limiting protuberances 126 outwardly extend from an exposed upper surface 127 of the rotor support column 120. The protuberances 126 may be posts, studs, ramps, blocks, or the like that outwardly extend from the upper surface 127. As shown, the rotor support column 120 may include two opposed protuberances 126 that are generally spaced 180 degrees from one another. The two opposed protuberances 126 provide a balanced housing 102. That is, the opposed protuberances 126 provide rotational limits past which a protuberance of the rotor 104 cannot past, thereby controlling rotation of the rotor 104 relative to the housing 102 within a desired range. The opposed protuberances 126 may be spaced apart a lesser or greater radial distance, depending on a desired range of rotation of the rotor 104 relative to the housing 102. Alternatively, the rotor support column 120 may include more or less protuberances than shown.

Figure 3:
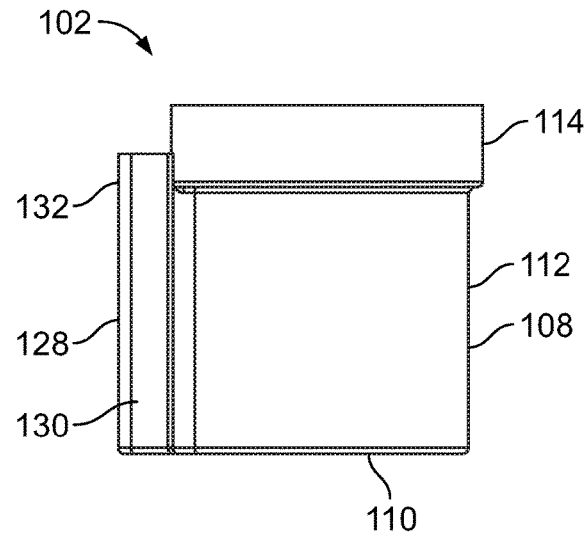
FIG. 3 illustrates a lateral view of a housing, according to an embodiment of the present disclosure.

FIG. 3 illustrates a lateral view of the housing 102. A spring retainer 128 extends from a side outer surface of the wall 112. The spring retainer 128 includes a beam 130 that outwardly extends from the wall 112 between the base 110 and the rim 114. As shown, the beam 130 may not extend to a top of the rim 114. Optionally, the beam 130 may be shorter or taller than shown. A canted beam 132 extends from the beam 130. The beam 130 and the canted beam 132 may be the same height between the base 110 and the rim 114. As described below, a portion of the spring 106 (shown in FIG. 1) is configured to hook or otherwise secured onto the spring retainer 128.

Figure 4:
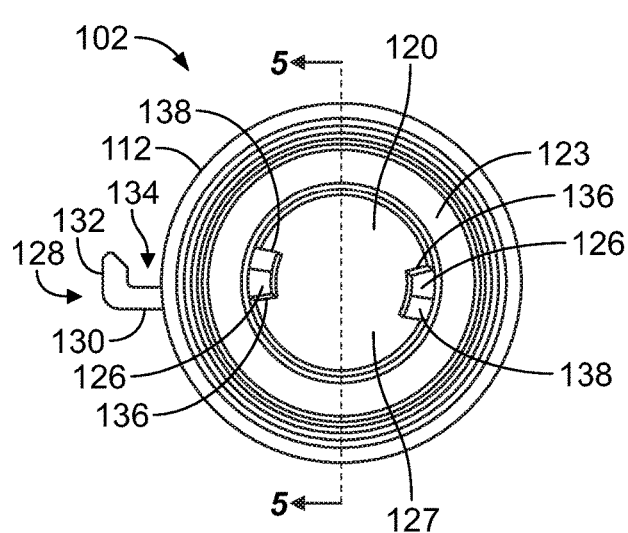
FIG. 4 illustrates a top view of a housing, according to an embodiment of the present disclosure.

FIG. 4 illustrates a top view of the housing 102. A spring-retaining channel 134 is defined between inner surfaces of the beam 130 and the canted beam 132, and an outer surface of the wall 112.

Each protuberance 126 may include an upstanding block 136 and a ramp 138 that downwardly angles from the block 136 to the upper surface 127 of the rotor support column 120. As shown, outer and inner radial surfaces of the protuberances 126 generally follow the arcuate curvature of the cylindrical rotor support column 120. Further, the blocks 136 and ramps 138 of the protuberances 126 are opposite from one another in relation to a circumference of the upper surface 127 of the rotor support column 120. Optionally, the protuberances 126 may be sized and shaped in a different manner, such as tabs, blocks, semi-spheres, and/or the like.

Figure 5:
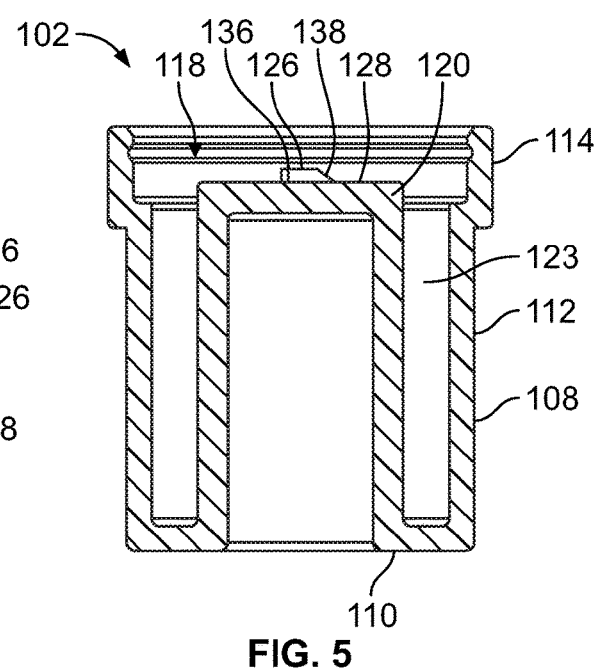
FIG. 5 illustrates a cross-sectional view of a housing through line 5-5 of FIG. 4, according to an embodiment of the present disclosure.

FIG. 5 illustrates a cross-sectional view of the housing 102 through line 5-5 of FIG. 4, according to an embodiment of the present disclosure. The rotor support column 120 upwardly extends into the cavity 118. The rotor retention channel 123 is formed between the rotor support column 120 and the wall 112.

Figure 6:
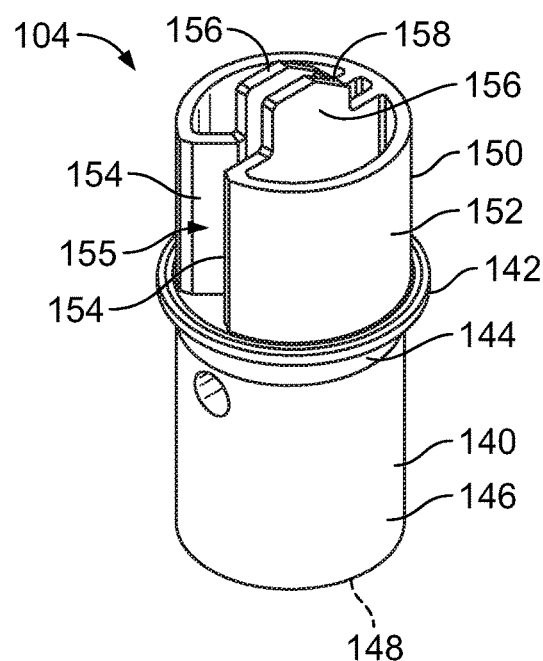
FIG. 6 illustrates a perspective top view of a rotor, according to an embodiment of the present disclosure.

FIG. 6 illustrates a perspective top view of the rotor 104, according to an embodiment of the present disclosure. The rotor 104 includes a support tube 140 that connects to an intermediate circumferential ledge 142 that caps an upper end 144 of the support tube 140. An opposite, lower end 146 of the support tube 140 is open to expose an interior chamber 148.

A spring-retaining member 150 extends upwardly from the ledge 142 opposite from the support tube 140. The spring-retaining member 150 includes an outer circumferential wall 152 that connects to inwardly-canted lead-in walls 154 that lead into a spring channel 155 therebetween. The inwardly-canted lead-in walls 154, in turn, connect to interior fins 156 that connect to a perpendicular end wall 158. The spring channel 155 is defined between inner surfaces of the lead-in walls 154, the fins 156, and the end wall 158.

Figure 7:
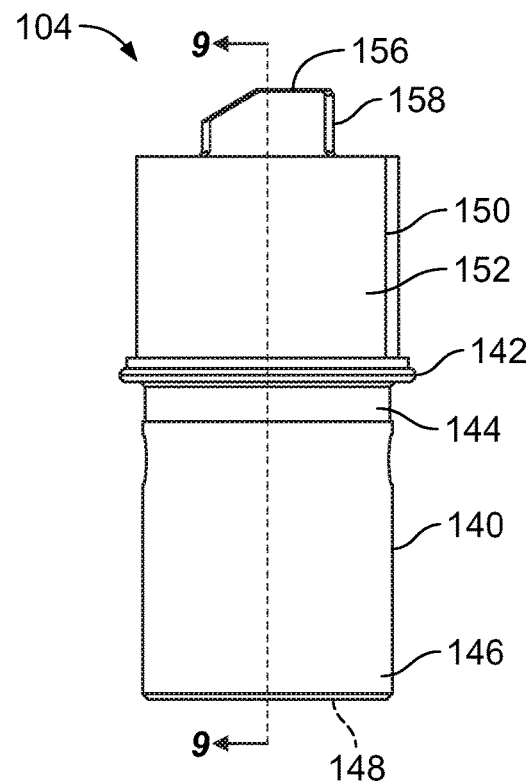
FIG. 7 illustrates a lateral view of a rotor, according to an embodiment of the present disclosure.

FIG. 7 illustrates a lateral view of the rotor 104. As shown, the fins 156 may extend above a height of the outer circumferential wall 152. The support tube 140 is configured to be rotationally retained within the rotor retention channel 123 of the housing 102 (shown in FIG. 5, for example). The spring-retaining member 150 is configured to extend upwardly above the rotor support column 120 shown in FIG. 5, for example).

Figure 8:
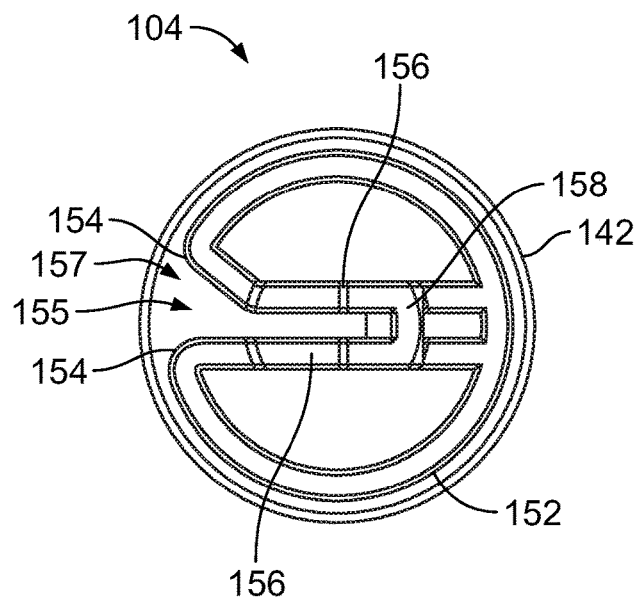
FIG. 8 illustrates a top view of a rotor, according to an embodiment of the present disclosure.

FIG. 8 illustrates a top view of the rotor 104. As shown, the lead-in walls 154 may not be mirror images of one another. The lead-in walls 154 may inwardly-angle differently in relation to one another, in order to provide an expanded inlet 157 into the spring channel 155.

Figure 9:
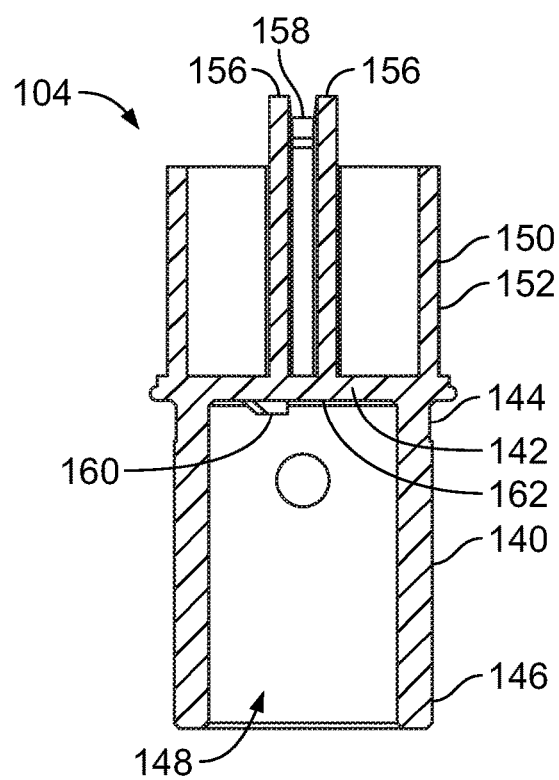
FIG. 9 illustrates a cross-sectional view of a rotor through line 9-9 of FIG. 7, according to an embodiment of the present disclosure.
Figure 10:
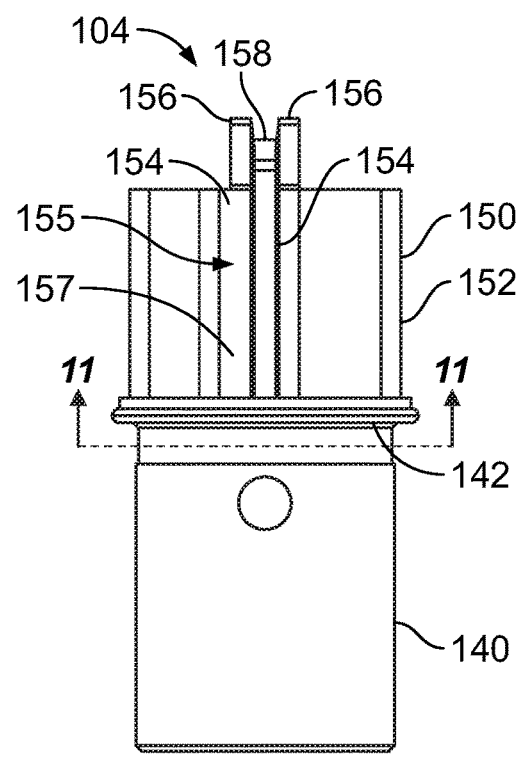
FIG. 10 illustrates an end view of a rotor, according to an embodiment of the present disclosure.
Figure 11:
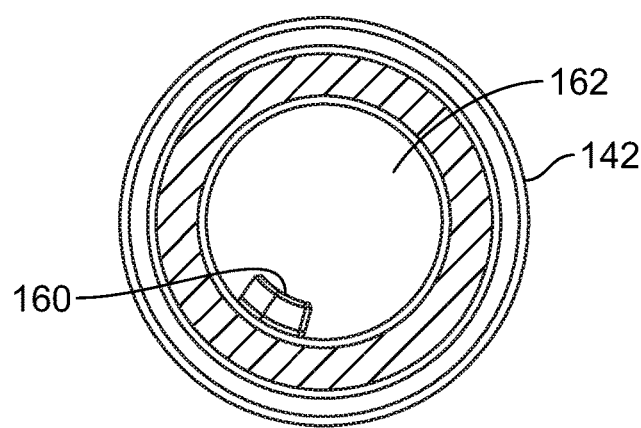
FIG. 11 illustrates a cross-sectional view of a rotor through line 11-11 of FIG. 10, according to an embodiment of the present disclosure.

FIG. 9 illustrates a cross-sectional view of the rotor 104 through line 9-9 of FIG. 7. FIG. 10 illustrates an end view of the rotor 104. FIG. 11 illustrates a cross-sectional view of the rotor 104 through line 11-11 of FIG. 10. Referring to FIGS. 9-11, the fins 156 may mirror one another, and provide flat retaining surfaces for a portion of a spring to fit therebetween. A rotor rotation-limiting protuberance 160 outwardly extends from a lower surface 162 of the ledge 142. The protuberance 160 may be sized and shaped similar to the protuberances 126 of the rotor support column 120 (shown in FIGS. 4 and 5, for example). The protuberance 160 may be a post, a stud, a tab, a ramp, a block, or the like.

When the rotor 104 is coupled to the housing 102 (shown in FIGS. 1-5), the protuberance 160 of the rotor 104 is configured to be rotated between and into the protuberances 126 of the housing 102. As the protuberance 160 rotates into either of the protuberances 126, further rotational motion in the particular direction is halted. As such, the protuberances 126 of the housing 102 provide rotational limits past which the protuberance 160 of the rotor 104 does not pass or further rotate, thereby controlling rotation of the rotor 104 relative to the housing 102. Optionally, the rotor 104 may include two protuberances 160, while the housing 102 include a single protuberance 126. As another option, the housing 102 may include one protuberance, while the rotor 104 includes another protuberance.

Referring to FIGS. 1-11, the rotor 104 is rotatably retained by the housing 102. In particular, the support tube 140 of the rotor 104 is rotatably retained within the rotor retention channel 123 of the housing 102.

The spring 106 includes a first end 170 that is securely trapped between the fins 156 within the spring channel 155. The first end 170 connects to a coiled body 172 that wraps and coils around the outer arcuate wall 152 of the rotor 104. The coiled body 172 may have more or less coils than shown. The coiled body 172 connects to a second end (hidden from view in FIG. 1) that may be disposed within the spring-retaining channel 134 of the spring retainer 128.

Figure 12:
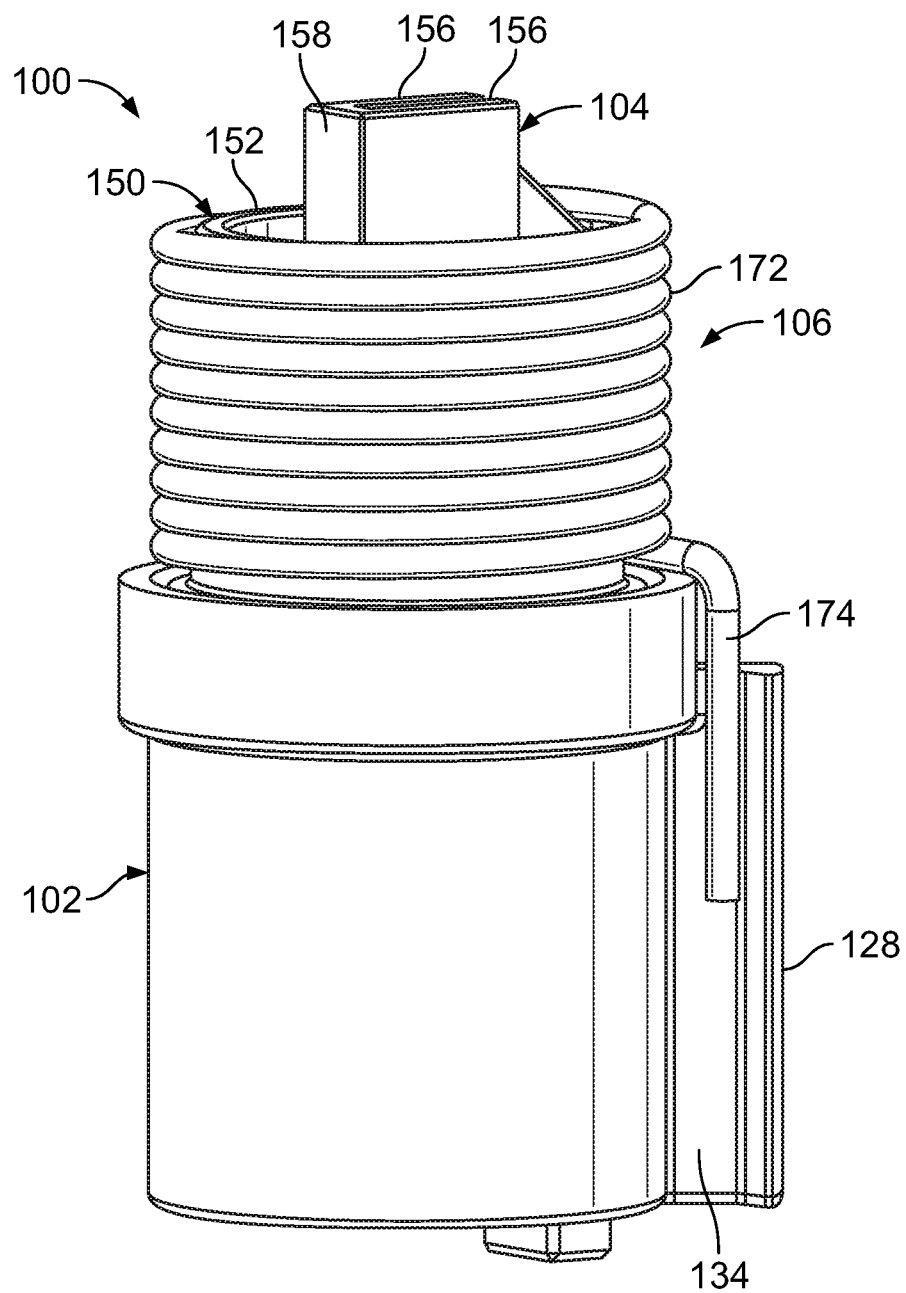
FIG. 12 illustrates a perspective lateral view of a damper assembly, according to an embodiment of the present disclosure.
Figure 13:
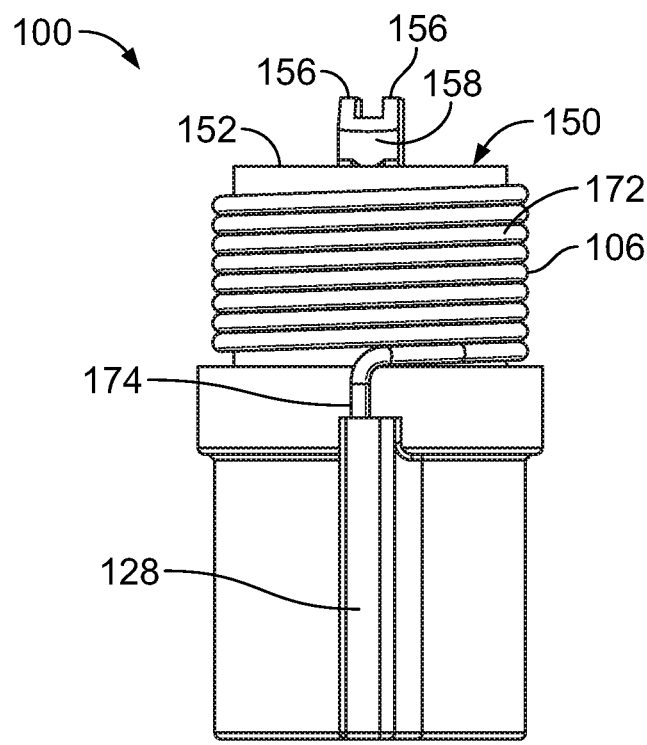
FIG. 13 illustrates an end view of a damper assembly, according to an embodiment of the present disclosure.
Figure 14:
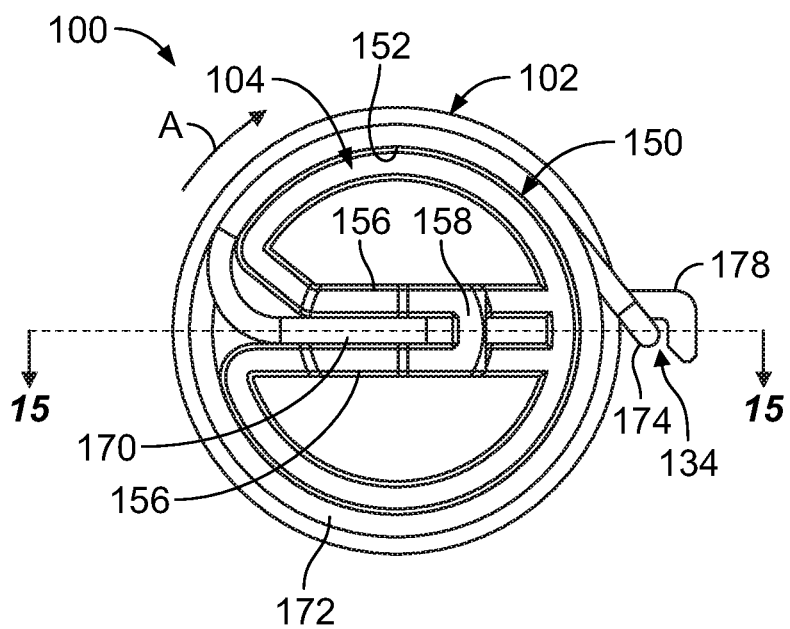
FIG. 14 illustrates a top view of a damper assembly, according to an embodiment of the present disclosure.

FIGS. 12, 13, and 14 illustrate a perspective lateral view, an end view, and a top view, respectively, of the damper assembly 100, according to an embodiment of the present disclosure. Referring to FIGS. 12-14, a second end 174 of the spring 106 may be retained by the spring retainer 128 within the spring-retaining channel 134. The second end 174 may be a straight, linear segment of the spring 106 that extends from the coiled body 172. Similarly, the first end 170 may be a straight, linear segment that extends from an opposite portion of the coiled body 172.

Figure 15:
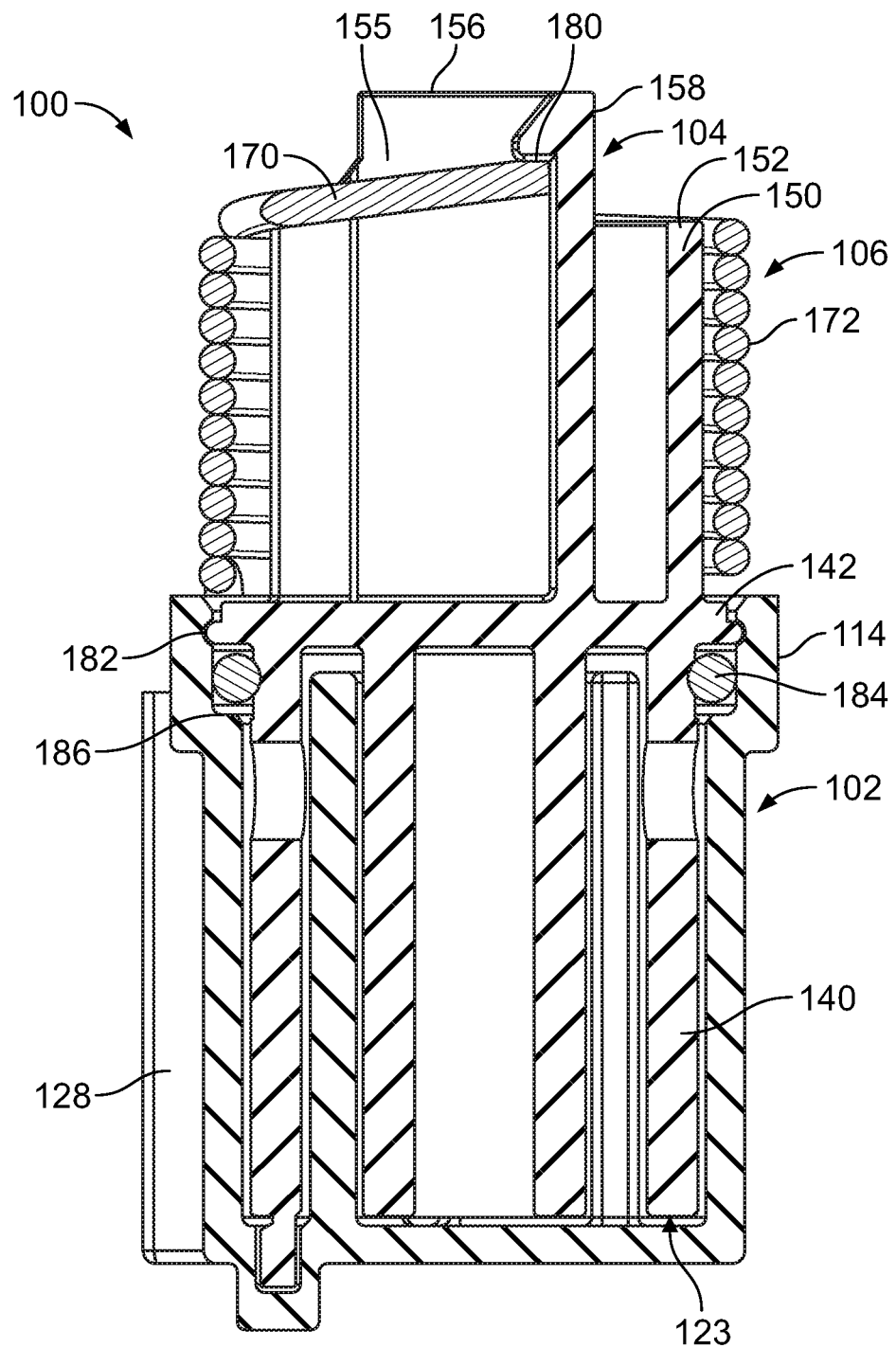
FIG. 15 illustrates a cross-sectional view of a damper assembly through line 15-15 of FIG. 14, according to an embodiment of the present disclosure.

FIG. 15 illustrates a cross-sectional view of the damper assembly 100 through line 15-15 of FIG. 14, according to an embodiment of the present disclosure. The coiled body 172 of the spring 106 wraps around the circumferential wall 152 of the spring-retaining member 150 of the rotor 104. The first end 170 of the spring 106 is trapped between the fins 156 within the spring channel 155. The end wall 158 may include a lower ridge 180 that secures the first end 170 from ejecting upwardly from the rotor 104.

The intermediate circumferential ledge 142 of the rotor 104 may be sized and shaped to fit within a reciprocal channel 182 formed in an inner surface of the annular rim 114 of the housing 102. An O-ring 184 may be secured underneath the rim 114 between an inner surface of the annular rim 114, an interior edge ridge 186 of the circumferential wall 112, and an outer surface of the support tube 140 proximate to the ledge 142.

Referring to FIGS. 1-15, in operation, the spring 106 exerts a rotational force that biases the rotor 104 into an at-rest state with respect to the housing 102. The first end 170 of the spring 106 is retained within the spring channel 155 between the fins 156 and the end wall 158, while the second end 174 is retained by the spring retainer 128.

To facilitate efficient spring pre-loading, the rotor 104 includes the protuberance 160 (shown in FIGS. 9 and 11). Upon rotation of the rotor 104 in relation to the housing 102, the protuberance 160 abuts against one of the protuberances 126 of the housing 102. Further, the contact between the protuberance 160 and the protuberances 126 provides a rotational stop or limit, which prevents the rotor from further rotating in such directions. The protuberance 160 and the protuberances 126 cooperate to provide a stop for spring pre-loading, while still allowing the damper assembly 100 to be torque tested during an assembly process.

In order to secure the rotor 104 to the housing 102, the rotor is inserted into the housing 102 over the rotor support column 120. During such process, the support tube 140 fits into the rotor retention channel 123, and the protuberance 160 extending downwardly from the ledge 142 of the rotor 104 is radially positioned between the protuberances 126 extending upwardly from the rotor support column 120. The damper assembly 100 may then be torque tested before the spring 106 is coupled to the housing 102 and the rotor 104.

Figure 16:
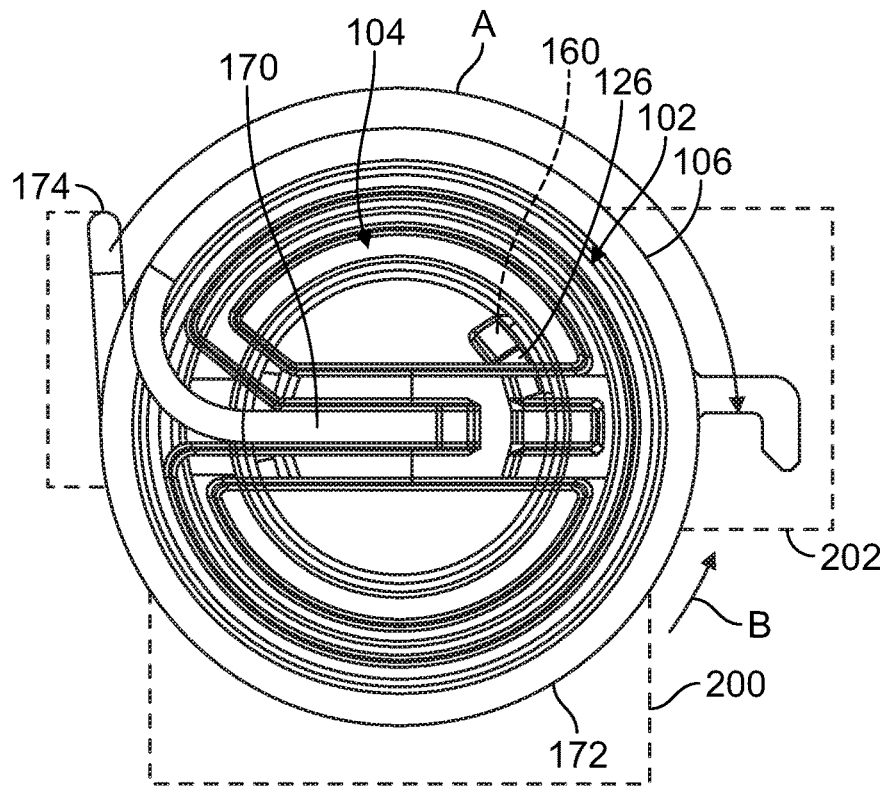
FIG. 16 illustrates a top, partial internal view of a damper assembly in a free state, according to an embodiment of the present disclosure.

FIG. 16 illustrates a top, partial internal view of the damper assembly 100 in a free state, according to an embodiment of the present disclosure. Referring to FIGS. 1-16, as the spring 106 is coupled to the housing 102 and the rotor 104, the rotor 104 tends to rotate in the direction of arc A (shown in FIGS. 14 and 16) as the second end 174 of the spring 106 is pulled over to engage the spring retainer 128. The abutting-interaction between the protuberance 126 of the housing 102 and the protuberance 160 of the rotor 104 prevents further rotation of the rotor 104 relative to the housing 102, thereby allowing the second end 174 of the spring 106 to hook or otherwise secure onto the retainer 128, and secure the rotor 104 to the housing 102 in a preloaded position (shown in FIG. 14).

In the pre-loaded position, the damper assembly 100 may then be loaded onto a component 200 (such as a bin), and then mated to another component 202 (such as a door pivotally coupled to the bin). As the component 202 is closed, the rotor 104 rotates the spring 106 into a fully closed position in the direction of arc B, allowing for a desired amount of force to be applied to the component 202 once a latch is released. In this manner, there is no need for additional preloading, thereby providing an improved and efficient installation process.

Figure 17:
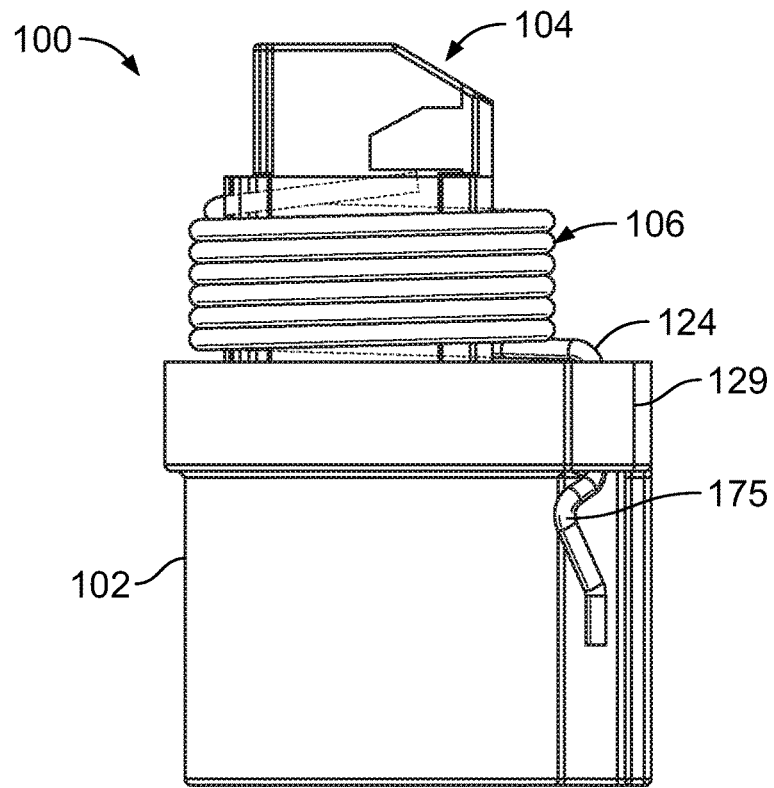
FIG. 17 illustrates a perspective lateral view of a damper assembly, according to an embodiment of the present disclosure.

FIG. 17 illustrates a perspective lateral view of a damper assembly 100, according to an embodiment of the present disclosure. In this embodiment, the spring retainer 128 may include a sleeve 129 defining an interior passage (hidden from view). The sleeve 129 fits around an entire outer circumference of a portion of the second end 174 of the spring 106, in order to provide additional secure retention thereof. In at least one embodiment, the sleeve 129 may extend over an entire length of the spring retainer 128.

Additionally, the second end 175 may include a bend 175. The bend 175 reduces the chance that the second end 175 will dislodge upwardly through the sleeve 129. In short, the sleeve 129 radially secures the second end 175 to the spring retainer 128, while the bend 175 longitudinally and/or axially secures the second end 175 to the spring retainer 128. It has been found that the sleeve 129 and the bend 175 prevent or otherwise reduce the risk of the spring 106 dislodging from the spring retainer 128, such as during shipping.

As described herein, embodiments of the present disclosure provide a damper assembly 100 including a housing 102, a rotor 104 rotatably secured to the housing 102, and a spring 106 that is configured to couple to the housing 102 and the rotor 104 in a preloaded position. The damper assembly 100 is easy to assemble and install. The damper assembly 100 is balanced in that undesired twisting forces are not exerted therein. The spring 106 may be preloaded into the housing 102 to allow for simple loading into a full component assembly, such as that of a glove compartment, an assist handle, and/or the like within a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A damper assembly that is configured to dampen motion between a first component and a second component, the damper assembly comprising:
   a housing including a main body defining a cavity and having a base integrally formed with a circumferential wall, a rotor support column extending from the base into the cavity to an upper surface, wherein the housing further includes at least one housing rotation-limiting protuberance extending outwardly from the upper surface; and
   a rotor that is rotatably coupled to the housing, wherein the rotor includes a support tube having a lower end and an upper end, the upper end connecting to an intermediate circumferential ledge that caps the upper end of the support tube, wherein the rotor further includes at least one rotor rotation-limiting protuberance extending outwardly from a lower surface of the intermediate circumferential ledge, the lower surface facing toward the lower end, wherein the at least one housing rotation-limiting protuberance and the at least one rotor rotation-limiting protuberance cooperate to limit a range of rotation of the rotor relative to the housing.

2. The damper assembly of claim 1, wherein the at least one housing rotation-limiting protuberance comprises a first housing rotation-limiting protuberance and a second housing rotation-limiting protuberance, and wherein the at least one rotor rotation-limiting protuberance comprises a first rotor rotation-limiting protuberance radially positioned between the first housing rotation-limiting protuberance and the second housing rotation-limiting protuberance.

3. The damper assembly of claim 1, further comprising a spring operatively coupled to the housing and the rotor.

4. The damper assembly of claim 3, wherein the spring comprises:
   a coiled body;
   a first end extending from the coiled body, wherein the first end is coupled to the rotor; and
   a second end extending from the coiled body, wherein the second end is coupled to the housing.

5. The damper assembly of claim 3, wherein the housing comprises a spring retainer that retains a portion of the spring to secure the rotor in a preloaded position relative to the housing.

6. The damper assembly of claim 5, wherein the spring retainer comprises beam and a canted beam extending from the beam, wherein a spring-retaining channel is defined between the beam and the canted beam.

7. The damper assembly of claim 5, wherein the spring retainer comprises a sleeve that fits around an outer circumference of a portion of the spring.

8. The damper assembly of claim 5, wherein the spring comprises a bend that is configured to securely couple the spring to the spring retainer.

9. The damper assembly of claim 1, wherein the housing further includes an annular rim extending from the circumferential wall; and a rotor retention channel that is formed between the circumferential wall and the rotor support column.

10. The damper assembly of claim 1, wherein the rotor comprises a spring-retaining member that extends from the intermediate circumferential ledge opposite from the support tube.

11. The damper assembly of claim 10, wherein the spring-retaining member comprises:
an outer wall that connects to inwardly-canted lead-in walls that lead into a spring channel;
interior fins that connect to the lead-in walls; and
an end wall connected to the interior fins.

12. A damper assembly that is configured to dampen motion between a first component and a second component, the damper assembly comprising:
a housing including at least one housing rotation-limiting protuberance, and a spring retainer;
a rotor that is rotatably coupled to the housing, wherein the rotor includes a spring-retaining member including an outer circumferential wall that connects to inwardly-canted lead-in walls that define a spring channel between the inwardly-canted lead-in walls, the inwardly-canted lead-in walls connecting to interior fins that extend above a height of the outer circumferential wall, the rotor further including at least one rotor rotation-limiting protuberance, wherein the at least one housing rotation-limiting protuberance and the at least one rotor rotation-limiting protuberance cooperate to limit a range of rotation of the rotor relative to the housing; and
a spring operatively coupled to the housing and the rotor, wherein the spring comprises a coiled body, a first end extending from the coiled body into the spring channel of the rotor, wherein the first end is coupled to the rotor between the inwardly-canted lead-in walls and between the fins, and a second end extending from the coiled body, wherein the second end is coupled to the housing, and wherein the second end is retained by the spring retainer.

13. The damper assembly of claim 12, wherein the at least one housing rotation-limiting protuberance comprises a first housing rotation-limiting protuberance and a second housing rotation-limiting protuberance, and wherein the at least one rotor rotation-limiting protuberance comprises a first rotor rotation-limiting protuberance radially positioned between the first housing rotation-limiting protuberance and the second housing rotation-limiting protuberance.

14. The damper assembly of claim 12, wherein the spring retainer comprises a beam and a canted beam extending from the beam, wherein a spring-retaining channel is defined between the beam and the canted beam, and wherein the second end is retained within the spring-retaining channel.

15. The damper assembly of claim 12, wherein the spring retainer comprises a sleeve that fits around an outer circumference of at least a portion of the second end.

16. The damper assembly of claim 12, wherein the second end of the spring comprises a bend that is configured to securely couple the spring to the spring retainer.

17. The damper assembly of claim 12, wherein the housing comprises:
a cylindrical main body including a base integrally formed with a circumferential wall;
an annular rim extending from the wall; and
a rotor support column extending from the base, wherein a rotor retention channel is formed between the circumferential wall and the rotor support column, wherein the at least one housing rotation-limiting protuberance extends from the rotor support column.

18. The damper assembly of claim 12, wherein the rotor comprises:
a support tube;
an intermediate circumferential ledge that caps the support tube,
wherein the spring-retaining member extends from the intermediate circumferential ledge opposite from the support tube, wherein the spring-retaining member securely retains the first end of the spring, wherein the spring-retaining member comprises the outer circumferential wall that connects to the inwardly-canted lead-in walls that lead into the spring channel, the interior fins that connect to the lead-in walls, and an end wall connected to the interior fins, wherein the spring channel is defined between the lead-in walls, the interior fins, and the end wall, and wherein the first end of the spring is retained within the spring channel.

19. A damper assembly that is configured to dampen motion between a first component and a second component, the damper assembly comprising:
a housing including at least one housing rotation-limiting protuberance, a spring retainer, a cylindrical main body including a base integrally formed with a circumferential wall, an annular rim extending from the circumferential wall, and a rotor support column extending from the base to an upper surface, wherein a rotor retention channel is formed between the circumferential wall and the rotor support column, wherein the at least one housing rotation-limiting protuberance extends outwardly from the upper surface of the rotor support column;
a rotor that is rotatably coupled to the housing, wherein the rotor includes at least one rotor rotation-limiting protuberance, wherein the at least one housing rotation-limiting protuberance and the at least one rotor rotation-limiting protuberance cooperate to limit a range of rotation of the rotor relative to the housing, wherein the rotor further comprises a support tube, an intermediate circumferential ledge that caps the support tube, and a spring-retaining member that extends from the intermediate circumferential ledge opposite from the support tube, wherein the spring-retaining member comprises an outer wall that connects to inwardly-canted lead-in walls that lead into a spring channel, interior fins that connect to the lead-in walls, and an end wall connected to the interior fins, wherein a spring channel is defined between the lead-in walls, the interior fins, and the end wall, and wherein the rotor rotation-limiting protuberance extends outwardly from a lower surface of the intermediate circumferential ledge, the lower surface facing opposite the spring-retaining member; and a spring operatively coupled to the housing and the rotor, wherein the spring comprises a coiled body, a first end extending from the coiled body, wherein the first end is coupled to the rotor, and a second end extending from the coiled body, wherein the second end is coupled to the housing, wherein the second end is retained by the spring retainer, wherein the spring-retaining member of the rotor securely retains the first end of the spring, and wherein the first end of the spring is retained within the spring channel.

* * * * *